(12) United States Patent
Kobayashi

(10) Patent No.: US 7,518,348 B1
(45) Date of Patent: Apr. 14, 2009

(54) ADAPTIVE ERROR AMPLIFIER CLAMP CIRCUIT TO IMPROVE TRANSIENT RESPONSE OF DC/DC CONVERTER WITH CURRENT MODE CONTROL

(75) Inventor: Hidenori Kobayashi, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 321 days.

(21) Appl. No.: 11/111,591

(22) Filed: Apr. 20, 2005

(51) Int. Cl.
*G05F 1/00* (2006.01)

(52) U.S. Cl. .................. 323/282; 323/284; 323/222

(58) Field of Classification Search .................. 323/282, 323/284, 222
See application file for complete search history.

(56) References Cited

U.S. PATENT DOCUMENTS

| | | | | |
|---|---|---|---|---|
| 5,821,740 | A * | 10/1998 | Hodgins et al. | 323/277 |
| 6,204,648 | B1 * | 3/2001 | Saeki et al. | 323/282 |
| 6,498,466 | B1 * | 12/2002 | Edwards | 323/282 |
| 6,677,738 | B1 * | 1/2004 | Hesse | 323/284 |
| 7,002,330 | B2 * | 2/2006 | Kitani et al. | 323/284 |
| 2006/0006854 | A1 * | 1/2006 | Oswald et al. | 323/282 |

OTHER PUBLICATIONS

U.S. Appl. No. 10/780,375, Broach et al.
U.S. Appl. No. 10/861,872, Broach et al.
U.S. Appl. No. 10/780,207, Broach et al.
Feng et al. "An Adaptive Current Mode Fuzzy Logic Controller for DC-to-DC Converters." IEEE Applied Power Electronics Conference 2003, vol. 2, pp. 983-989.

* cited by examiner

*Primary Examiner*—Akm E Ullah
*Assistant Examiner*—Nguyen Tran
(74) *Attorney, Agent, or Firm*—Darby & Darby P.C.; Matthew M. Gaffney

(57) ABSTRACT

A current mode controlled DC/DC converter that includes an adaptive clamp voltage circuit at an error amplifier output to significantly reduce overshoot in the output of the converter if the target voltage changes rapidly. If a current limiter is active, the clamp level of the adaptive clamp voltage circuit is decreased at an appropriate rate. Similarly, if the current limiter is not activated, the adaptive clamp voltage circuit is restored to an initial clamp level. The operation of the adaptive clamp circuit at the output of the error amplifier enables a relatively faster reduction in both overshoot and the amount of time before the converter's output voltage and output current settle back down to a relatively constant state.

13 Claims, 7 Drawing Sheets

US 7,518,348 B1

ADAPTIVE ERROR AMPLIFIER CLAMP CIRCUIT TO IMPROVE TRANSIENT RESPONSE OF DC/DC CONVERTER WITH CURRENT MODE CONTROL

FIELD OF THE INVENTION

The present invention relates to adaptively adjusting a clamp circuit in an error amplifier for a DC/DC converter, and more particularly, to improving the transient response of a DC/DC converter with current mode control.

BACKGROUND OF THE INVENTION

A Direct Current to Direct Current (DC/DC) converter is often used to improve efficiency, reduces power consumption and heat dissipation in both mobile (battery powered) and non-mobile electronic devices. A typical current mode controlled DC/DC converter includes several circuits such as an error amplifier circuit, a pulse width modulated (PWM) comparator circuit, and a current limiting circuit.

For a typical current mode controlled DC/DC converter, the error amplifier circuit monitors the converter's output voltage and reference target voltage signal and outputs the reference current signal voltage. This reference current signal voltage is converted to a current by a voltage-to-current (V/I) converter, and the PWM comparator compares this reference current to the output current. The switch control circuit turns on and off the output transistor in accordance with the output of the PWM comparator.

Additionally, the current limiting circuit is usually arranged to limit the peak value of an inductor current at the typical DC/DC converter's output, which works independently of the PWM comparator. If the inductor current is higher than a limiting value, a current limit comparator becomes high and the switch control circuit stops (turns off) the high side output transistor. In this way, Direct Current (DC) magnetic saturation can be reduced or substantially eliminated at an output inductor, which in turn protects the integrity of the converter's output transistors. However, a typical current mode controlled DC/DC converter arranged in this manner often generates relatively large output overshoot if the reference target voltage changes quickly.

In operation, the conventional DC/DC converter increases or decreases the inductor current based on at least the level of the current reference signal detected by the error amplifier. For example, if the output voltage is higher than the target voltage, the error amplifier decreases the current reference signal, then the converter would subsequently decrease the inductor current by turning off the high side output transistor earlier than the previous cycle. Alternatively, if the output voltage is determined to be lower than the target voltage, then the error amplifier would increase the current reference signal, and in response, the converter would increase the inductor current by turning off the high side output transistor later than a previous cycle.

The current limiter works independently of the PWM comparator and if the inductor current is higher than the predetermined value, the current limiter also commands the switch control circuit to turn off the high side transistor.

However there is a case, where the converter causes significant overshoot if the converter is employed above the current limit function. If the target voltage significantly changes low to high, the error amplifier increases the current reference signal and PWM comparator and switch controller increase the inductor current. When the inductor current reaches the current limit level, current limiter controls the inductor current and inductor current does not increased anymore. If the output voltage still does not reaches the target voltage, the error amplifier continues to increase it's output voltage until it hits the fixed clamp voltage. The fixed clamp voltage is usually set significantly higher voltage, and the current reference signal becomes significantly higher than inductor current, which is limited below current limit by current limit circuit. Then the output voltage reaches to the target voltage, error amplifier decreases it's output and current reference signal. However, the current reference signal is significantly higher than current limit level, it takes some time to take back the inductor current control from current limiter. During this period, the inductor current still stay around current limit value even the output is higher than target voltage. Excess inductor current lead to a significant amount of overshoot in the output voltage that can be unacceptable in many applications.

DETAILED DESCRIPTION OF THE INVENTION

Figure 1:
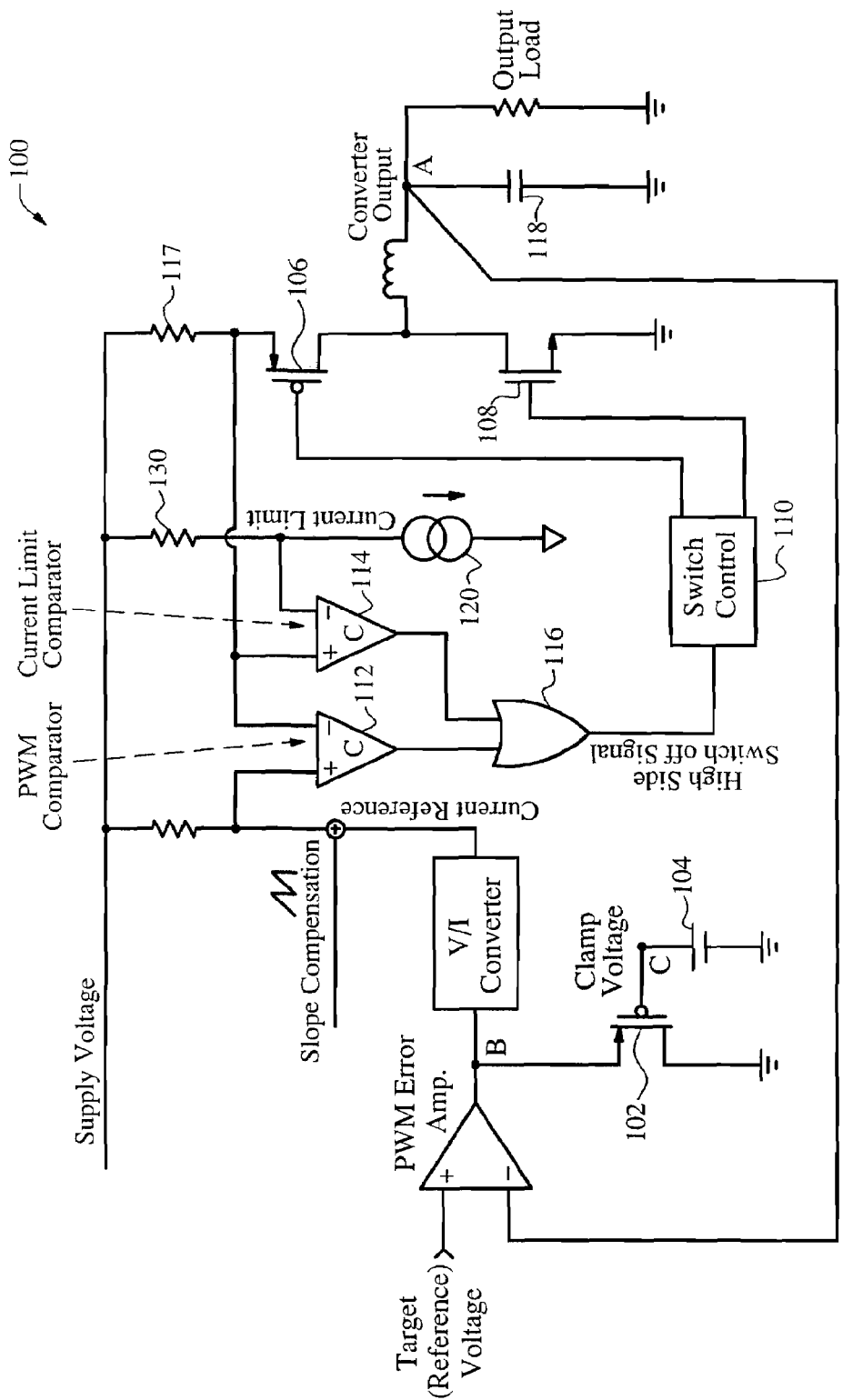
FIG. 1 illustrates a schematic diagram of an exemplary current mode control switching DC/DC converter circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

The invention is directed to a current mode controlled DC/DC converter that includes an adaptive clamp voltage circuit of error amplifier output to significantly reduce overshoot and undershoot in the output of the converter if the target voltage changes rapidly. In operation, the error amplifier controls the inductor current to stabilize the output voltage at the target voltage. Also, the adaptive clamp voltage circuit clamps the output voltage of error amplifier, and it's clamp level is decreasing during the current limit is activated.

When a target voltage rise rapidly, error amplifier increase the current reference signal and inductor current increase in part by controlling the switching of the output transistors. Once the inductor current reaches the current limit, current limiter circuits limit and control the inductor current instead of error amplifier and PWM comparator. Because the output voltage is not reached to the target voltage, error amplifier tried to increase it's output voltage to increase the reference current signal and output voltage.

At the same time after current limit is activated, the clamp level of inventive adaptive clamp circuit is gradually falling, and pulls down the output of the error amplifier. By this clamp circuits, the error amplifier's output and current reference signal is decreased even though the converter output voltage is lower than target voltage. If the current reference signal becomes lower than current limit, the error amplifier and PWM comparator takes back the control from current limit circuits and the clamp level of adaptive clamp circuits rises because the current limit is inactive now. If output voltage is still lower than target voltage, the error amplifier output increase, and current limit circuit is activated again. Then the error amplifier output decrease again until it takes back the control from current limit circuits. In this way, the reference current signal, which proportional to error amplifier output voltage, stays around the current limit level and once the output voltage becomes higher than the target voltage, the error amplifier output quickly takes back the control from current limit circuits and decrease the inductor current. As a result, the overshoot of output voltage is minimized when the target voltage changes.

FIG. 1 illustrates exemplary converter 100 that is a current mode controlled DC/DC converter and does not provide for an adaptive clamp voltage at the output of the error amplifier. An error amplifier amplifies the difference between the actual output voltage of converter 100 at an output node (Node A) and a reference (target) voltage. This amplified difference voltage is converted to current by a voltage to current converter to generate a current reference signal, which in turn is summed with a slope compensation signal and provided at the non-inverting input to comparator 112. An output current sense resistor 117 is coupled between the voltage supply and the inverting input of current reference comparator 112, whose output is provided to an input of "OR" gate 116. The output of current limit comparator 114 is coupled to the other input of OR gate 116. Also, the non-inverting inputs of current limit comparator 114 are coupled through current sensing resistor 17. And its inverting input is coupled to current source 120 and resistor 130 that is coupled to the supply voltage, which together generate the current limit level.

The output of OR gate 116 is provided to switch control circuit 110 which is in turn coupled to the gates of the output transistors for converter 100 (MOS transistor 106 and 108). The operation of MOS output transistors 106 and 108 are controlled at their gates by switch circuit 110. The source and drain of MOS transistor 106 is coupled between the supply voltage and the converter's output (Node A). Similarly, source and drain of MOS transistor 108 is coupled between earth and Node A. Additionally, capacitor 118 is coupled to Node A where it provides for smoothing output ripples in the output voltage of converter 100.

Also, MOS transistor 102 is coupled between earth and the output of the error amplifier, and its gate is coupled to fixed clamp voltage source 104 at Node C. The output of the amplifier won't be higher than fixed clamp level, but this fixed clamp level is usually set significantly higher than the steady state control range.

Generally, the output of PWM comparator 112 is employed by switch control 110 to control the operation of the output MOS transistors 106 and 108 which in turn control the output voltage. For example, if the output voltage rises above the target voltage, the ratio of high side MOS transistor 106 on-time is increased during switching cycle. If the output voltage drops below the target voltage, then high side MOS transistor 106 on-time is decreased during the switching cycle.

If the target voltage rises rapidly, the control loop increases the inductor current because the output voltage is lower than the target voltage. Then if the inductor current reaches the predetermined current limit threshold, the output of current limiter comparator 114 takes over control of the MOS output transistors 106 and 108 to limit the inductor current below the current limit threshold. While the error amplifier continues to increase its output voltage and reaches the fixed clamp level of clamp circuit 104. Once output voltage reaches target voltage, the error amplifier output voltage is significantly higher than its control range and it takes time to come back down to the control range. During this period, inductor current is still controlled by current limiter comparator 114 and stays at the current limit level even if the output is higher than the target voltage. Consequently, excess overshoot can occur in response to the change in the target voltage.

Figure 2A:
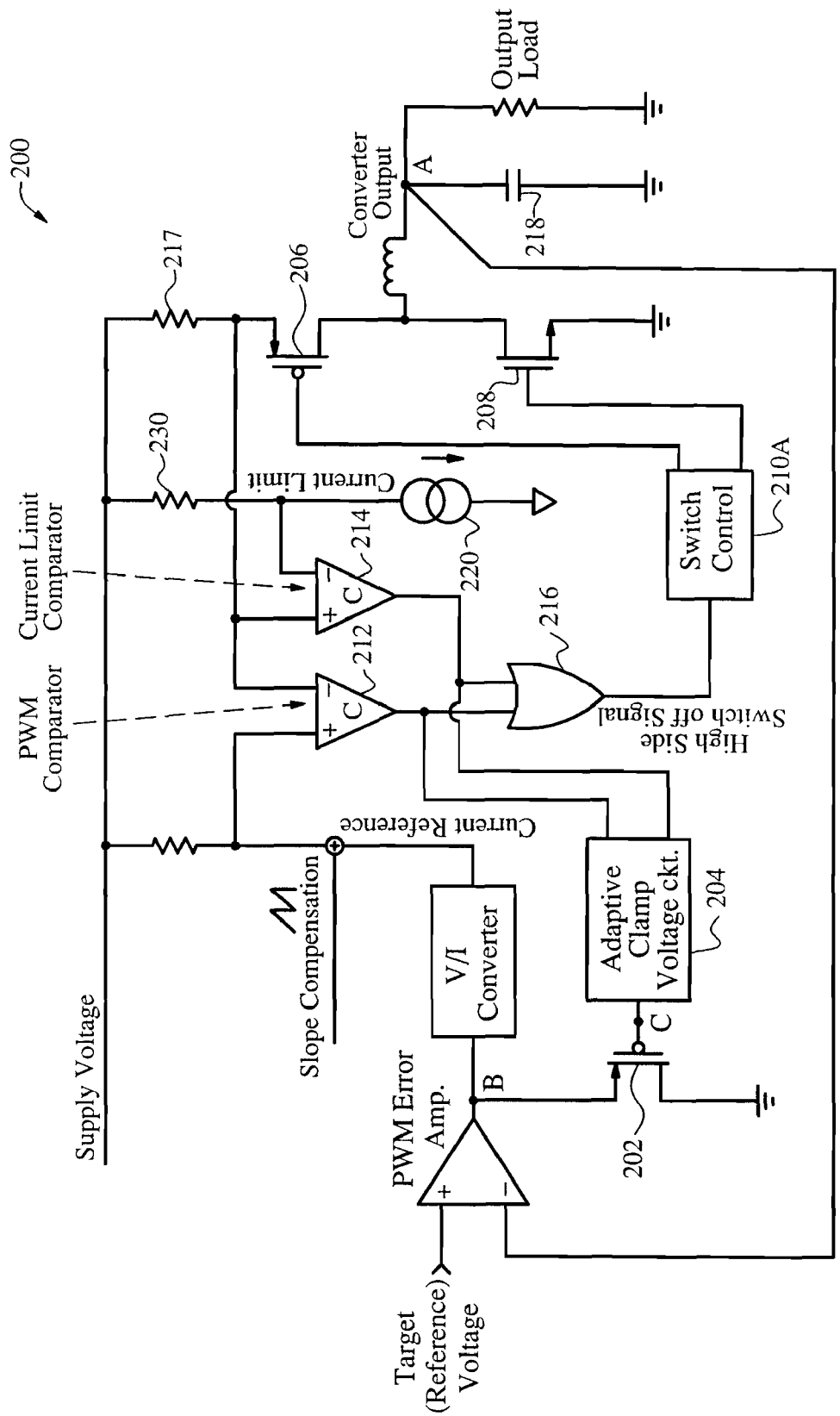
FIG. 2A shows a schematic diagram of an exemplary DC/DC converter circuit that includes an adaptive voltage clamp circuit.

FIG. 2A illustrates another schematic diagram of converter 200 that is arranged and operates in a manner somewhat similar to FIG. 1, albeit different in several ways. In this embodiment, an error amplifier amplifies the difference between the actual output voltage of converter 200 at an output node (Node A) and a reference (target) voltage. This amplified difference voltage is converted to current by a voltage to current converter to generate a current reference signal, which in turn is summed with a slope compensation signal and provided at the non-inverting input to comparator 212. An output current sense resistor 217 is coupled through the inverting inputs of current reference comparator 212, whose output is provided to an input of "OR" gate 216. The output of current limit comparator 214 is coupled to the other input of OR gate 216. Also, the non-inverting input of current limit comparator 214 is coupled through a current sensing resistor to the supply voltage. And its inverting input is coupled to current source 220 and resistor 230 that is coupled to the supply voltage, which together generate the current limit level.

The output of OR gate 216 is provided to switch control circuit 210 which is in turn coupled to the gates of the output transistors for converter 200 (MOS transistor 206 and 208). The operation of MOS output transistors 206 and 208 are controlled at their gates by switch circuit 210. The source and drain of MOS transistor 206 are coupled between the supply voltage and the converter's output (Node A). Similarly, the source and drain of MOS transistor 208 are coupled between earth and Node A. Additionally, capacitor 218 is coupled to Node A where it provides for smoothing ripples in the output voltage of converter 200.

Also, MOS transistor 202 is coupled between earth and the output of the error amplifier, and its gate is coupled to adaptive clamp voltage source 204 at Node C. In operation, the output of the PWM error amplifier is clamped at the active clamp level. The active clamp level is decreased to a steady state control range if the adaptive clamp circuit is activated.

Generally, the output of PWM comparator 212 is employed by switch control 210 to control the operation of the MOS output transistors 206 and 208 which in turn control the output voltage. For example, if the output voltage rises above the target voltage, the ratio of high side MOS transistor 206 on-time is increased during switching cycle. If the output voltage drops below the target voltage, then high side MOS transistor 206 on-time is decreased during switching cycle.

If the target voltage rises rapidly above the control loop, the inductor current increases because the output voltage is lower than the target voltage. Then if the inductor current reaches the predetermined current limit threshold, the output of current limiter comparator 214 takes over control of the MOS output transistors 206 and 208 to limit the inductor current below current limit threshold. Though the error amplifier continues to increase its output voltage, the clamp level of clamp circuit 204 is decreased. Once the error amplifier's output is clamped by the active clamp circuit, the error amplifier's output voltage decreases according to the clamp level as long as the current limit circuit is activated. If the error amplifiers' output becomes low and the reference current signal becomes lower than the current limit threshold level, the PWM comparator takes back the control but the active clamp level starts to increase. Until the output voltage reaches the target level, the PWM comparator and current limit comparator in turn control the inductor current. If the output voltage reaches the target voltage, the PWM comparator takes back the control quickly without excess delay, and excess overshoot on the output voltage can be substantially eliminated.

Figure 2B:
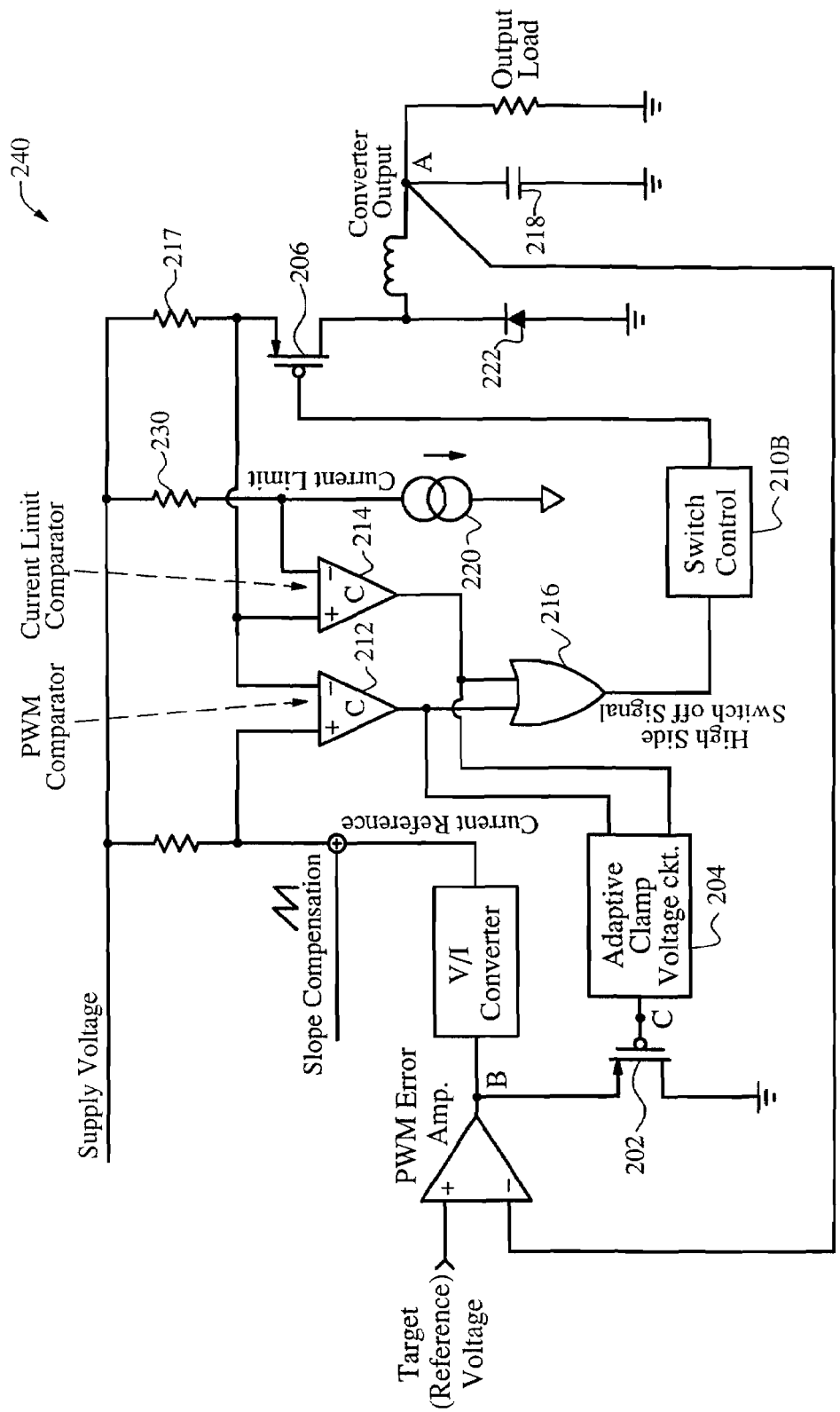
FIG. 2B illustrates a schematic diagram of an exemplary DC/DC converter circuit that includes an adaptive voltage clamp circuit and a diode disposed between the output and a low side of a voltage supply.

FIG. 2B illustrates another schematic diagram of converter 240 which includes substantially the same components as FIG. 2A and is arranged to operate in a manner somewhat similar, albeit different in several ways. The switch control 210B is arranged to control the operation of MOS output transistor 206 and it does not control the operation of MOS transistor 208, which has been replaced by diode 222. Additionally, the cathode of diode 222 is coupled to the converter's output at Node C and it's anode is coupled to earth.

Figure 3A:
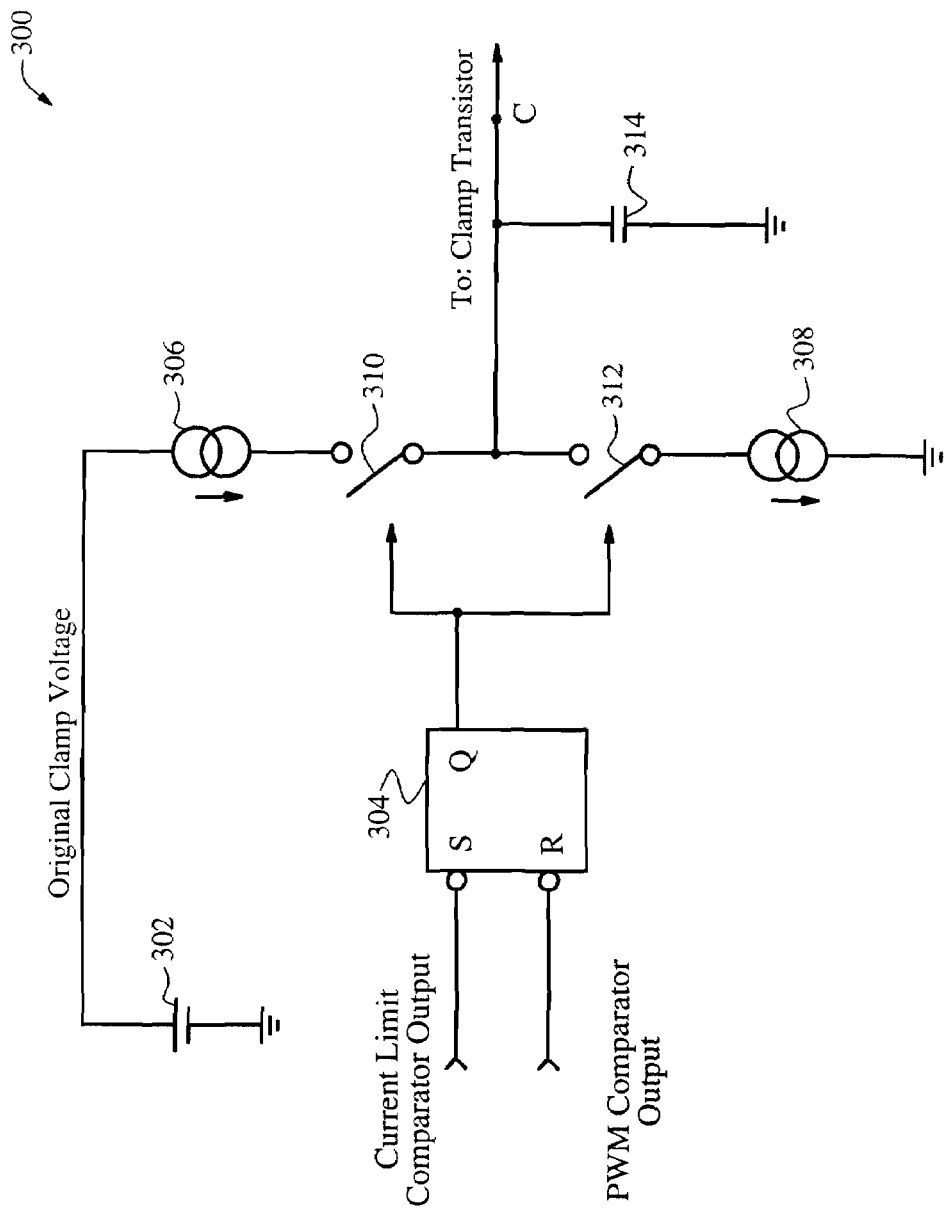
FIG. 3A shows a schematic diagram of an exemplary adaptive voltage clamp circuit.

FIG. 3A illustrates a schematic diagram of inventive adaptive clamp voltage circuit 300 which is arranged and operates in a manner substantially similar to circuit 204 which is shown in FIGS. 2A and 2B. Circuit 300 includes Latch 304 which is arranged with a set or "S" input coupled to the output of a Current Limit Comparator (not shown but is substantially similar to the configuration of comparator 214 in FIGS. 2A and 2B). Also, Latch 304 is arranged with the reset or "R" input coupled to the output of a PWM Comparator (not shown but is substantially similar to the configuration of comparator 212 in FIGS. 2A and 2B).

The non-inverting output of Latch 304 is coupled to switches 310 and 312 and controls these switches in a manner where if one switch is closed, the other switch is open. Also, switch 310 is coupled between current source 306 and Node C which is coupled to a gate of a clamp MOS transistor (not shown but is substantially similar to MOS transistor 202 in FIGS. 2A and 2B). Current source 306 is also coupled between voltage source 302 and switch 310. Additionally, switch 312 is coupled between Node C and current sink 308, and capacitor 314 is coupled between Node C and earth.

Generally, in operation, clamp circuit 300 provides a highest voltage which is equal to voltage source 302, to the gate of the clamp MOS transistor if the PWM comparator is controlling the operation of the converter's output MOS transistors (steady state of operation) because Switch 310 is closed and switch 312 is open. However, when the Current Limit comparator takes over control of the output transistors (non-steady state of operation), switch 310 is opened and switch 312 is closed and the voltage, which provides to clamp MOS transistor, is gradually decreased.

Figure 3B:
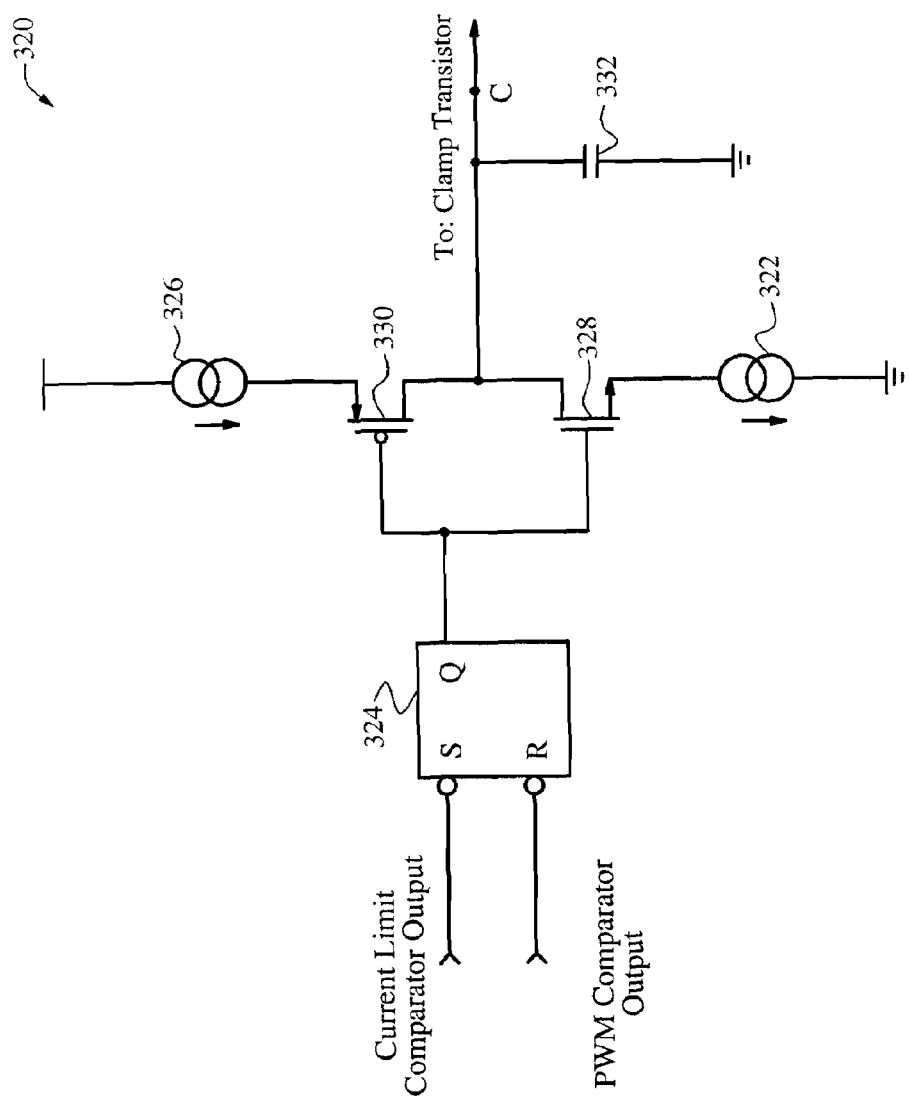
FIG. 3B illustrates a schematic diagram of another exemplary adaptive voltage clamp circuit.

FIG. 3B illustrates another schematic diagram of inventive adaptive clamp voltage circuit 320 which includes substantially the same components as circuit 300 in FIG. 3A and is arranged to operate in a manner somewhat similar, albeit different in several ways. In this embodiment of the invention, circuit 320 includes Latch 324 which is arranged with a set or "S" input coupled to the output of a Current Limit Comparator (not shown but is substantially similar to the configuration of comparator 214 in FIGS. 2A and 2B). Also, Latch 324 is arranged with the reset or "R" input coupled to the output of a PWM Comparator (not shown but is substantially similar to the configuration of comparator 212 in FIGS. 2A and 2B).

The non-inverting output of Latch 324 is coupled to MOS transistors 330 and 328 and controls these transistors in a manner where if one transistor is conducting, the other transistor is not. Also, MOS transistor 330 is coupled between current source 326 and Node C which is coupled to a gate of a clamp MOS transistor (not shown but is substantially similar to MOS transistor 202 in FIGS. 2A and 2B). Current source 326 is also coupled between the voltage supply and MOS transistor 330. Additionally, MOS transistor 328 is coupled between Node C and current sink 322, and capacitor 332 is coupled between Node C and earth.

Generally, in operation, clamp circuit 300 provides a highest voltage which is equal to supply voltage, to the gate of the clamp MOS transistor if the PWM comparator is controlling the operation of the converter's output MOS transistors (steady state of operation) because Switch 310 is closed and switch 312 is open. However, when the Current Limit comparator takes over control of the output transistors (non-steady state of operation), switch 310 is opened and switch 312 is closed and the voltage, which provides to clamp MOS transistor, is gradually decreased.

Simulation Graphs

Figure 4:
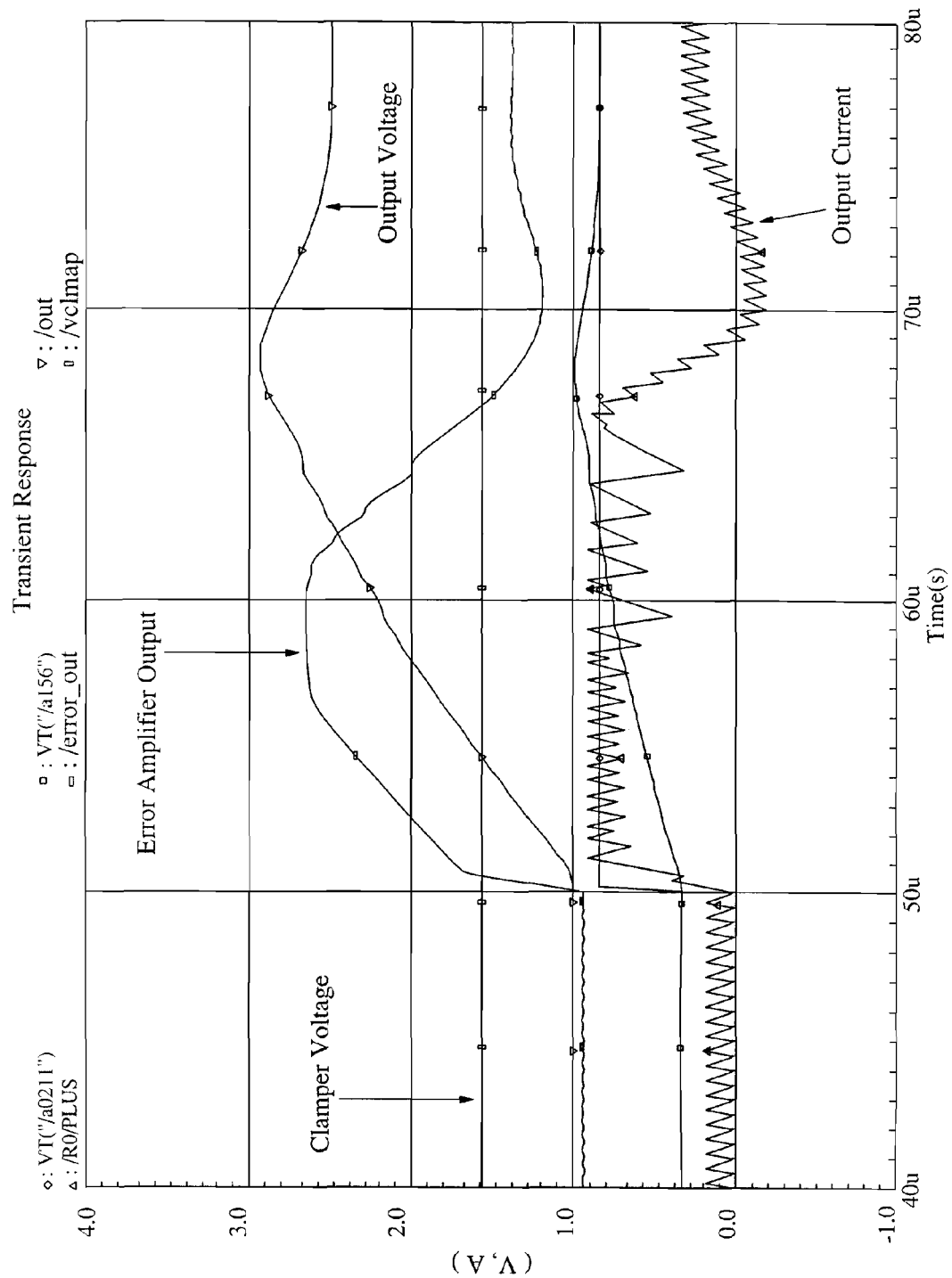
FIG. 4 illustrates a graph of the output of an exemplary DC/DC converter that does not include an adaptive voltage clamp circuit.

FIG. 4 illustrates a simulated operation for a converter that includes a fixed clamp circuit coupled to the output of the error amplifier. In this simulation, the target voltage is changed from 1.0v to 2.5v at 50 usec.

As shown, the error amplifier voltage rises dramatically in response to a rapid target voltage increase at 50 microseconds. The output (inductor) current also rapidly rises according to error amplifier output, and hits a current limit threshold at 52 microseconds. The current limit circuit controls the output (inductor) current from 52 microseconds to 67 microseconds. While, the error amplifier output continues to increase until it reaches the fixed clamp voltage level at 57 microseconds. The converter output reaches the target voltage 2.5v at 62 microseconds and the output of the error amplifier starts to decrease. However, since the error amplifier output is substantially higher than the control range, it takes 5 microseconds to take back the output (inductor) current control from the current limit circuit. During this 5 microseconds delay, excess inductor current goes through the output capacitor, which causes excess overshoot at the output voltage. The overshoot voltage is more than 400 mV in this simulation.

Figure 5:
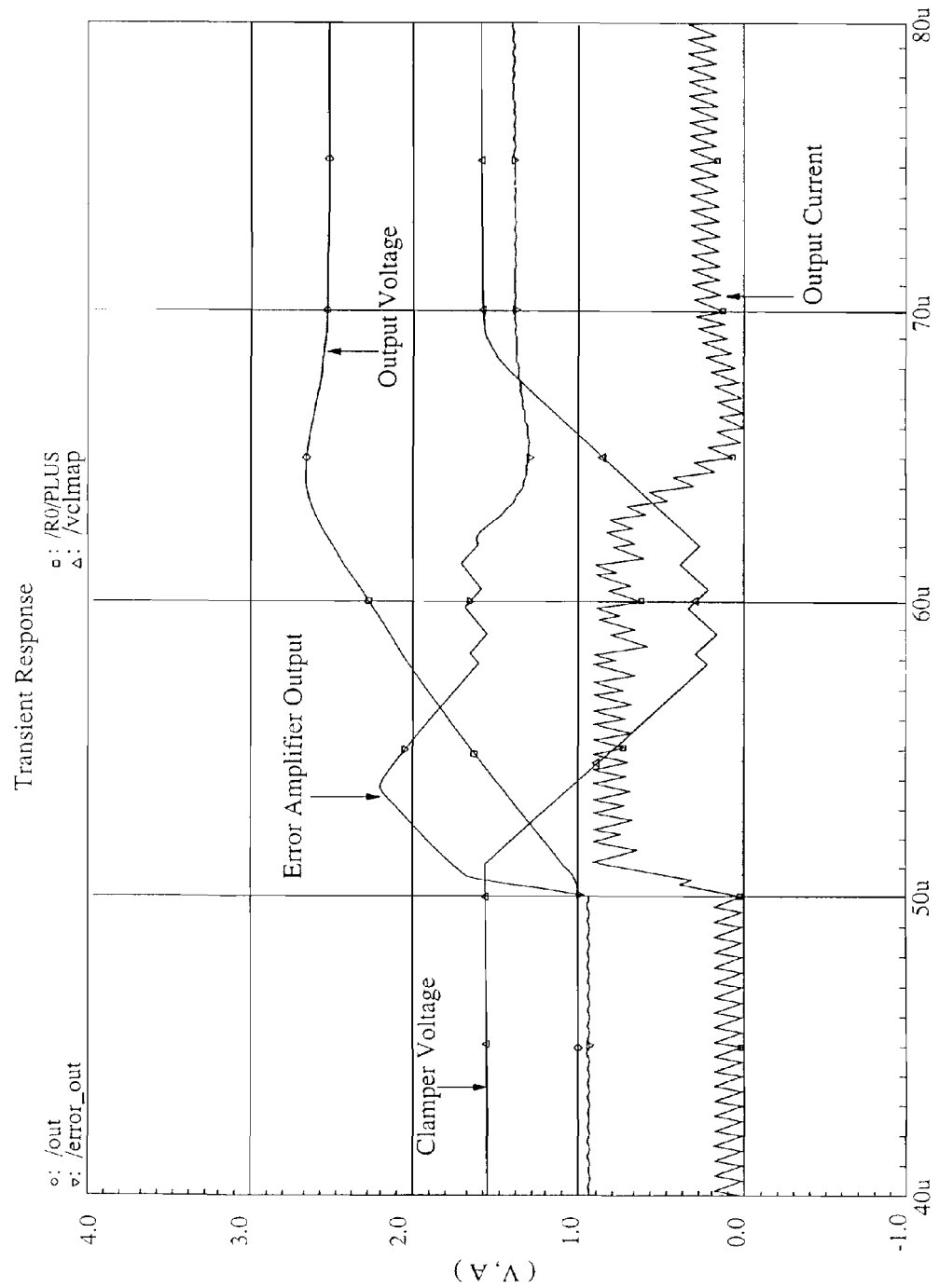
FIG. 5 shows a graph of the output of an exemplary DC/DC converter that incorporates an adaptive voltage clamp circuit accordance with the invention.

FIG. 5 illustrates a simulated operation for a converter that includes an adaptive clamp circuit according to aspects of the invention coupled to the output of the error amplifier. In this simulation, the target voltage is changed from 1.0v to 2.5v at 50 usec same as FIG. 4 case.

As shown, the error amplifier voltage rises dramatically in response to a rapid target voltage increase at 50 microseconds. The output (inductor) current also rapidly rises according to error amplifier output, and hit the current limit threshold at 52 microseconds. Current limit circuit starts to control the output (inductor) current from 52 microseconds. At substantially the same time, the clamper voltage starts to decrease. The error amplifier output continues to increase and reaches the clamp voltage level at 54 microseconds, and then the clamped error amplifier output is pulled down according to a decreasing clamp voltage level.

At 58 microseconds, the error amplifier output becomes low enough to take back the control of the converter from the current limit control, and the current limit circuit becomes inactive. At this point, since the output voltage has not yet reached a target voltage, the error amplifier continues to increase its output voltage to increase the inductor current. Also, the inductor current hits the current limit threshold. The adaptive clamp circuit is active and starts to decrease its clamp voltage again and the error amplifier's output is decreased and the error amplifier takes back the control of the converter again. This iteration is continued until the converter output reaches the target voltage.

At 63 micro sec, the converter output reaches the target output voltage, and the error amplifier can decrease its output by itself. The output (inductor) current decreases according to the error amplifier's output voltage without any delay. Therefore, excess output (inductor) current is minimized and the overshoot is also minimized. In this case, the overshoot is 200 mV, which is more than half of the previous simulation.

The above specification, examples and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A direct current to direct current (DC/DC) converter, comprising:
   an output stage for providing an output voltage;
   an error amplifier for comparing the output voltage to a target voltage, wherein the error amplifier is enabled to control the output voltage;
   a current limiter for holding an output current below a current limit level such that the current limiter is respectively activated and inactivated when the output current is above and below the current limit level; and
   a clamp circuit that is coupled to an output of the error amplifier, wherein if the current limiter is inactivated, an initial clamping level of the clamp circuit is provided, and wherein if the current limiter is activated, the initial clamping level of the clamping circuit is decreased to a relatively lower clamping level, wherein the current limiter includes:
   a circuit for providing a predetermined current limit level signal; and
   a comparator which receives as one input the current limit level signal and as another input a signal that corresponds to the output current, wherein said comparator produces a signal that inactivates and activates the clamp circuit when the output current level signal is respectively below and above that of the current limit level signal.

2. The converter of claim 1, further comprising:
   a pulse width modulated (PWM) comparator coupled to an output current sense signal and an output of the error amplifier;
   a current limit comparator coupled to the output current sense signal and a current limit threshold signal that is associated with the current limit level; and
   a switch control for controlling the output voltage based on the switching of a conductance of at least one transistor coupled to a voltage supply and an output inductance of the output stage and at least another transistor coupled to the output inductance and earth, wherein the operation of the switch control is further controlled by an OR'ing of an output of the PWM comparator and the current limit comparator.

3. The converter of claim 1, further comprising:
   a Pulse Width Modulated (PWM) comparator coupled to an output current sense signal and the output of the error amplifier;
   a current limit comparator coupled to the output current sense signal and a current limit threshold signal that is associated with the current limit level;
   a switch control for controlling the output voltage based on the switching of the conductance of at least one transistor coupled to a voltage supply and an output inductance of the output stage, wherein the operation of the switch control is further controlled by an OR'ing of an output of the PWM comparator and current limit comparator; and
   a diode coupled between an output inductance of the output stage and earth.

4. The converter of claim 1, wherein the clamp circuit includes at least one latch for controlling a clamping voltage of the error amplifier's output, wherein if the current limiter is inactivated, an initial clamping level of the clamp circuit is provided, and wherein if the current limiter is activated, the clamping circuit employs a relatively lower clamping level than the initial clamping level.

5. The converter of claim 1, wherein the clamp circuit includes at least one flip flop for controlling a clamping voltage of the error amplifier's output, wherein if the current limiter is inactivated, an initial clamping level for the clamp circuit is provided, and wherein if the current limiter is activated, the clamping circuit employs a relatively lower clamping level than the initial clamping level.

6. The converter of claim 1, wherein the clamp circuit includes at least two current sources for controlling a clamping voltage of the error amplifier's output.

7. The converter of claim 1, wherein the converter is a direct current to direct current (DC/DC) switching converter.

8. The converter of claim 1, wherein the output stage further comprises at least a high side MOS output transistor and a low side MOS output transistor.

9. The converter of claim 1, further comprising a capacitor that is coupled to the output stage, wherein the capacitor is arranged to smooth out ripples in the output voltage.

10. The circuit of claim 1, further comprising:
    a pulse width modulated (PWM) comparator coupled to an output current sense signal and an output of the error amplifier; and
    a current limiter comparator coupled to the output current sense signal and a current limit threshold signal.

11. The converter of claim 10, further comprising a switch control for controlling the output voltage based on the switching of a conductance of at least one transistor coupled to a voltage supply and an output inductance of the output stage and at least another transistor coupled to the output inductance and earth, wherein the operation of the switch control is further controlled by an OR'ring of an output of the PWM comparator and the current limit comparator.

12. The converter of claim 10, further comprising:
    a switch control for controlling the output voltage based on the switching of the conductance of at least one transistor coupled to a voltage supply and an output inductance of the output stage, wherein the operation of the switch control is further controlled by an OR'ing of an output of the PWM comparator and current limit comparator; and
    a diode coupled between an output inductance of the output stage and earth.

13. A method for controlling direct current to direct current (DC/DC) conversion, comprising:

comparing an output voltage to a target voltage with an error amplifier that is enabled to control the output voltage; and enabling an activated current limiter to hold an output current below a current limit level such that the current limiter is respectively activated and inactivated when the output current is above and below the current limit level, wherein if the current limiter is inactivated, providing an initial clamping level at an output of the error amplifier, and if the current limiter is activated, holding a relatively lower clamping level at the output of the error amplifier, wherein enabling the activated current limiter to hold the output current below the current limit level includes:

providing a predetermined current limit level signal; and comparing the current limit level signal to a signal that corresponds to the output current such that the comparison produces a signal that inactivates and activates the clamping when the output current level signal is respectively below and above that of the current limit level signal.

* * * * *

UNITED STATES PATENT AND TRADEMARK OFFICE
CERTIFICATE OF CORRECTION

| | |
|---|---|
| PATENT NO. | : 7,518,348 B1 |
| APPLICATION NO. | : 11/111591 |
| DATED | : April 14, 2009 |
| INVENTOR(S) | : Hidenori Kobayashi |

It is certified that error appears in the above-identified patent and that said Letters Patent is hereby corrected as shown below:

In column 8, line 54, in claim 11, delete "OR'ring" and insert -- OR'ing --, therefor.

Signed and Sealed this

Twenty-fourth Day of November, 2009

David J. Kappos
*Director of the United States Patent and Trademark Office*